US011535570B2

(12) United States Patent
Fox

(10) Patent No.: US 11,535,570 B2
(45) Date of Patent: Dec. 27, 2022

(54) ASPHALT PACKETS, ASPHALT MIXTURE SYSTEMS AND RELATED METHODS

(71) Applicant: NiTech Corporation, Durham, NC (US)

(72) Inventor: Steve A. Fox, South Pomfret, VT (US)

(73) Assignee: NiTech Corporation, Durham, NC (US)

( * ) Notice: Subject to any disclaimer, the term of this patent is extended or adjusted under 35 U.S.C. 154(b) by 35 days.

(21) Appl. No.: 16/661,470

(22) Filed: Oct. 23, 2019

(65) Prior Publication Data

US 2020/0231510 A1   Jul. 23, 2020

Related U.S. Application Data

(62) Division of application No. 16/255,415, filed on Jan. 23, 2019, now Pat. No. 10,487,015.

(51) Int. Cl.
| | |
|---|---|
| *C04B 26/26* | (2006.01) |
| *C04B 40/00* | (2006.01) |
| *B65B 41/16* | (2006.01) |
| *C04B 24/26* | (2006.01) |
| *B65B 9/02* | (2006.01) |

(52) U.S. Cl.
CPC ............ *C04B 40/0042* (2013.01); *B65B 9/02* (2013.01); *B65B 41/16* (2013.01); *C04B 24/2623* (2013.01); *C04B 24/2688* (2013.01); *C04B 26/26* (2013.01); *C04B 40/0085* (2013.01)

(58) Field of Classification Search
CPC . C04B 40/0085; C04B 26/26; C04B 24/2623; C04B 2103/0077; C08L 23/00; C08L 53/02; C08L 2555/22; C08L 2555/52; C08L 95/00; C08L 53/025; B65B 9/02; Y02A 30/30
USPC ........................................................ 523/205
See application file for complete search history.

(56) References Cited

U.S. PATENT DOCUMENTS

| | | |
|---|---|---|
| 3,026,568 A | 3/1962 | Moar |
| 3,196,487 A | 7/1965 | Snelling |
| 3,632,418 A | 1/1972 | Draper |
| 3,783,000 A | 1/1974 | Takase et al. |
| 3,965,281 A | 6/1976 | Takase et al. |
| 4,054,632 A | 10/1977 | Franke |
| 4,728,276 A | 3/1988 | Pauley et al. |
| 4,769,288 A | 9/1988 | Saylak |
| 5,254,385 A | 10/1993 | Hazlett |
| 5,290,833 A | 3/1994 | Schmanski |
| 5,414,197 A | 5/1995 | Wakeley et al. |
| 5,637,350 A | 6/1997 | Ross |
| 5,688,449 A | 11/1997 | Fox |
| 6,120,899 A | 9/2000 | Cameron et al. |
| 6,238,732 B1 | 5/2001 | Cameron et al. |
| 6,440,205 B1 | 8/2002 | Bailey et al. |
| 6,824,600 B2 | 11/2004 | Bailey et al. |
| 6,863,724 B2 | 3/2005 | Bailey et al. |
| 7,691,195 B2 | 4/2010 | Fox |
| 7,767,259 B2 | 8/2010 | Fox |
| 10,487,015 B1* | 11/2019 | Fox ..................... C04B 24/2623 |
| 2015/0183178 A1* | 7/2015 | Lindquist .................. B32B 1/00 |
| | | 428/137 |
| 2018/0155629 A1 | 6/2018 | Vincent et al. |

FOREIGN PATENT DOCUMENTS

| | | |
|---|---|---|
| EP | 3 222 690 A1 | 9/2017 |
| WO | WO 93/23224 | 11/1993 |

* cited by examiner

*Primary Examiner* — Hannah J Pak
(74) *Attorney, Agent, or Firm* — Michael Best & Friedrich LLP

(57) ABSTRACT

Asphalt packets and methods of making and using asphalt packets are provided. For example, an asphalt packet can be provided that include asphalt that comprises an inner volume and a polymer film outer coating that encapsulates the inner volume of the asphalt. The polymer film outer coating can be non-tacky at ambient temperatures to permit stacking of a plurality of asphalt packets under weight without causing the packets to agglomerate.

11 Claims, 11 Drawing Sheets

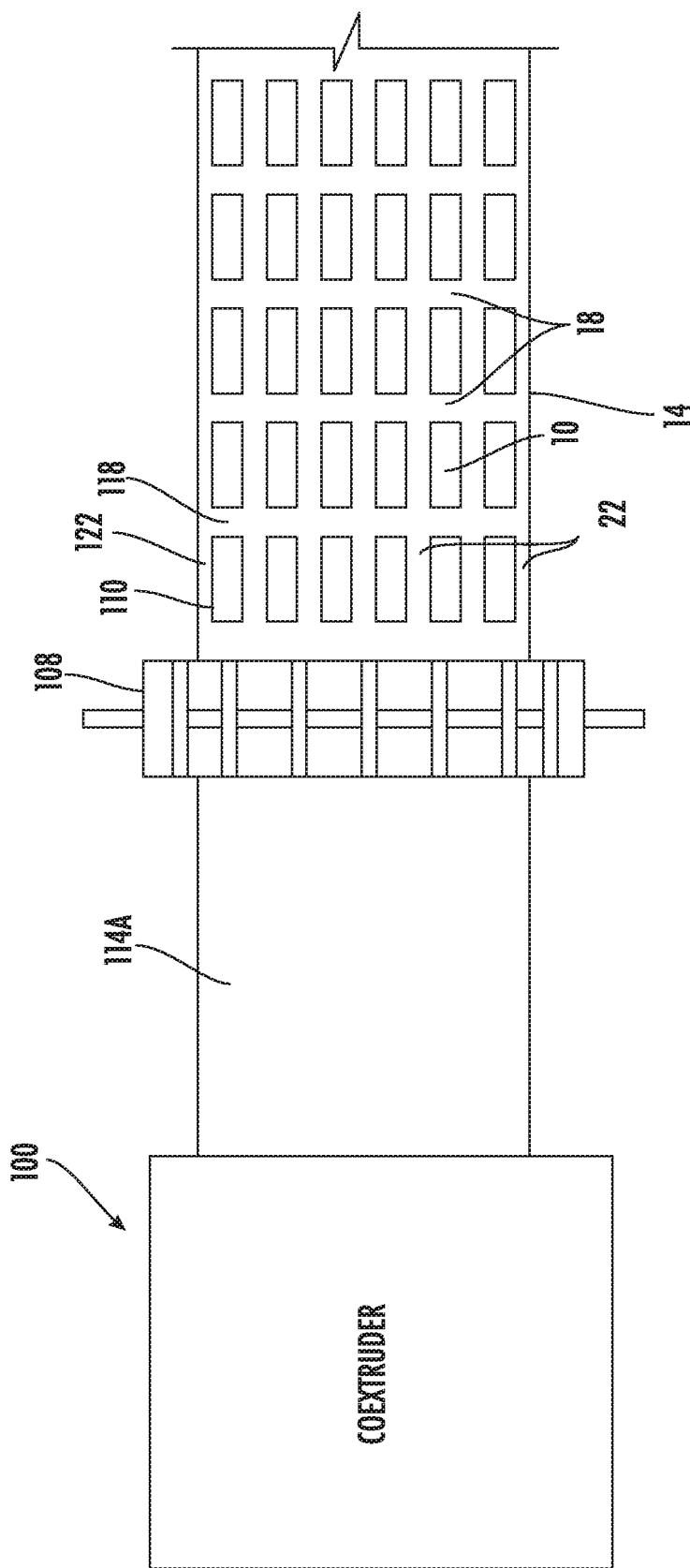

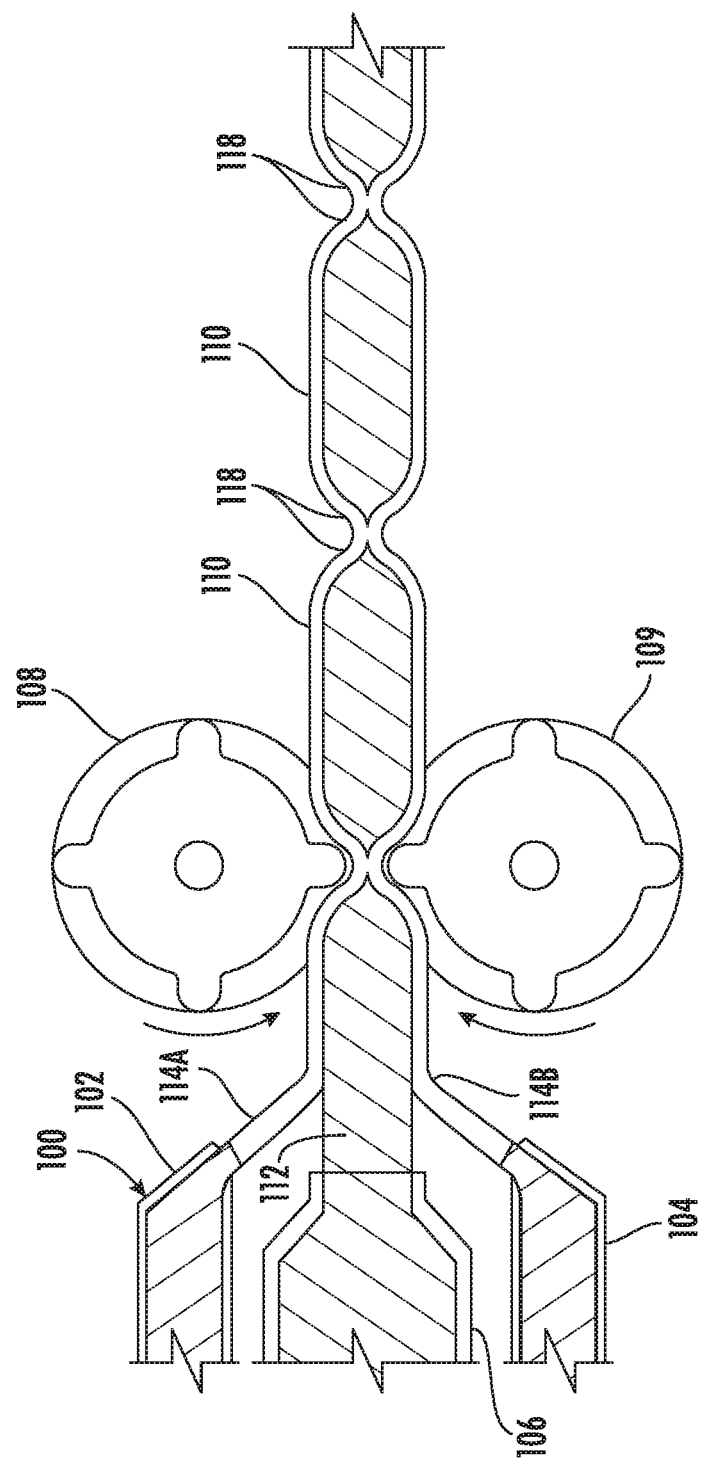

ASPHALT PACKET MELT TIMES V. SURFACE-TO-VOLUME RATIO OF THE ASPHALT PACKETS

ASPHALT PACKETS, ASPHALT MIXTURE SYSTEMS AND RELATED METHODS

RELATED APPLICATION

The presently disclosed subject matter claims the benefit of U.S. patent application Ser. No. 16/255,415 filed Jan. 23, 2019, the disclosure of which is incorporated herein by reference in its entirety.

TECHNICAL FIELD

The present subject matter relates to asphalt packets, asphalt mixture systems, and related methods. In particular, the present subject matter relates to asphalt packets that can be stored together at ambient temperatures separate from any aggregate used in a hot mix asphalt without fear of adhesion to other packets and aggregation that causes the asphalt packets to clump together.

BACKGROUND

Hot mix asphalt (hereinafter "HMA") or stone matrix asphalt (hereinafter "SMA") is commonly used in highway construction for paving both in new road construction and in maintenance of existing roads which have surface cracks or potholes. Similarly, HMA and SMA mixes are used in airfield construction for paving both new runways and in maintenance of existing runways. These HMA and SMA mixes are currently produced in stationary plants utilizing liquid asphalt stored at temperature above the melting point typically above 250° F. to 300° F. This liquid asphalt is then pumped into a gradation of heated stone aggregated which has a specific particle size distribution properly suited for the paving or repair application. Different gradations are used for different applications, usually ranging in particle size from material passing 200 mesh (0.003 inch) to 0.75- or 1-inch diameter. About 5% to 7% by weight asphalt is mixed with the aggregate to produce HMA or SMA. Plastic asphalt utilizing polymers as binders for the aggregate have also been used.

The creation and use of HMA and SMA mixes can be challenging, since both the HMA and SMA mixes and the asphalt used in the HMA and SMA mixes require the use of large amounts of energy to be maintained at relatively high temperatures until used. For example, the transport of such asphalt to be used as binder in the various asphaltic mixture applications can be problematic. Typically, asphalt is handled in bulk form as a hot liquid due to the fact that the material tends to stick together as individual particles even at room temperature when stored in the same container. During processing in anticipation for use, the asphalt must be kept heated at over 275° F. in liquid form for subsequent handling and mixing. For example, asphalt binder is handled as a hot liquid from its origination point, usually the refinery, with heated rail cars or trucks. The asphalt binder remains heated in its liquefied state through shipment to and during use in the asphalt mix plant. Since such material must be maintained at elevated temperatures for transfer to storage tanks and any transfer from one container to another until ultimate use, significant amounts of energy in the form of heat must be expended in order to maintain the asphalt in its liquefied state. It is estimated that, in the United States alone, over 20 billion pounds of liquid asphalt is used each year for paving, all of which must be kept continuously heated prior to use. Depending on any additives or other materials added to the asphalt, maintaining the asphalt at elevated temperatures for prolonged periods can adversely affect the properties of the asphalt.

Similarly, problems arise in the transport of the HMA and SMA mixes. To pave roads which may be 30 or 50 miles or more from the mix plant, very careful and difficult coordination is required between the production of the hot HMA and SMA mixes at the plant, the use of large trucks with consequent traffic control, the need to maintain the HMA and SMA mixes at a controlled temperature to the jobsite, and the coordination of the paving crew and equipment for proper installation of the HMA and SMA mixes for paving and patching roads, bridge decks, parking lots, airport runways, and other paving jobs. The maintenance of proper temperature of the HMA and SMA mixes is difficult to control due to the long distances the mixes are hauled. This failure of maintain the proper temperature often presents problems.

Situations which present particular difficulty using these fixed plant trucking systems are maintenance, patching, and off-season work. For example, roads, including high traffic roads, that are remote from a mixing plant may be damaged creating situations involving security and safety risks where quick local action is required. As another example, remote airfields may become damaged thus rendering them unusable. Often maintenance or pothole patching may only require a few tons of HMA or SMA at a location remote from a mixing plant. To send a truck with three to five tons of HMA from a mix plant may take several hours of expensive labor and equipment and often excess material is dumped on vacant land, creating an environmental hazard to be resolved later. This conventional system is expensive and inefficient for use for small amounts of maintenance, patching, and off-season work, especially in remote areas.

A typical drum plant used to produce asphalt today can include a direct fire continuous plant where the aggregate is introduced into a rotating drum, heated and dried to about 300° F., and liquid asphalt at about 300° F. is then introduced toward the end of the drum into the hot aggregate and mixed in the last section of the drum and then discharged as hot mix in a continuous method at about 300° F. Such a drum method can provide a continuous supply of asphalt at high throughput rates of 200 to over 500 tons per hour. The liquid asphalt, however, must be kept hot continuously from the refinery, stored hot, and handled hot. Such asphalt drum mix plants have other drawbacks that exacerbate this heating problem including the facts that such plants are expensive, take time and expertise to start up, require trained personnel to operate, and are not easily moved Further, it is difficult to meter the asphalt in a liquid in an accurate ratio generally within 1% with the continuous flow of aggregate to maintain high quality hot mix. Such processes require expensive sophisticated control systems to monitor and maintain the process.

One alternative to hot mix patching is an emulsified asphalt mix applied at ambient temperature with solvents and water evaporation after placement. These "cold" mix systems are inferior in quality and must be replaced often. Also, they can be very expensive.

Another alternative uses small, portable mix units, typically 5 to 15 tons/hr, to heat recycled asphalt (hereinafter "RAP") for patching. These units do not produce HMA or SMA of adequate quality to meet pavement grade specifications. Further, many state departments of transportation allow for only so much RAP in any given mixture of asphalts. These units normally use open flame to heat the mix which has previously been coated with binder. This open flame can degrade the RAP mix which already has the binder coating. In order to reheat the RAP mix, the aggregate which has already been coated with asphalt or polymer binders requires a large amount of heat to get the aggregate to a working temperature of 300° F. to 350° F. Such a temperature will burn or thermally degrade the asphalt or polymer coating creating a substandard product which will not meet the standards or specifications of most state departments of transportation or specifications for new hot mix. Also, large amounts of smoke and unhealthy gases are produced.

To help mitigate some the problems outlined above with drum plant asphalt production as well as localized on-site small patch asphalt production, pelletized asphalt has been developed: Asphalt pellets can be manufactured by a two-step coating process which produces pellets that are over 90% virgin performance grade asphalt and the coating is mostly a fine clay which forms part of the asphalt mix design. These pellets can then be evenly mixed in a package with other aggregates to form a prepackaged asphalt mix. All materials of aggregate and asphalt are measured accurately during packaging to assure accurate formulations. These measures combined with good mixing in the field produce asphalt which is as good as or better than the virgin asphalt hot mix produced in commercial mix plants with the advantage of being capable of being stored at ambient temperatures when integrated with the aggregate and produced in minutes in remote locations upon demand. Storage and transport of the prepackaged asphalt mix is at room temperature and greatly reduces the cost of keeping the asphalt hot and reduces the degradation and separation of the asphalt from its additives over time.

The pellets are mixed with the proper aggregate mix design gradation, usually composed of 3 or 4 different gradations of aggregate from approved quarries to form a mixture of virgin asphalt and aggregate with the accurate proportions of materials for a specific mix design. This asphalt mix is placed in one ton supersacks, 5 gallon pails, or other containers and can be stored on site at ambient temperature in remote locations for up to 5 years or longer. When needed for fast repairs, this asphalt mix is placed in a direct or indirect fire rotating heated mixer and can produce high quality hot mix in 10 minutes or more depending on the mixer. This type of asphalt mix is currently used for repair in military airfields and other critical locations for both asphalt and concrete pavements, some of which are in remote locations that are thousands of miles from hot mix plants.

The accurate mixture of asphalt pellets and aggregate in a container such as a supersack which is transportable and storable at a remote location makes high quality repair of asphalt surfaces possible by producing hot mix on site anytime with relatively low capital cost and unskilled labor without a mix plant. However, pelletization and coating the asphalt in a fine powder coating is expensive. Therefore, the cost of producing the pelletized asphalt mix is costly. It is currently being used in small quantities for critical reapplications where material cost is not a major issue.

Further, pelletized asphalt provides fast melting and mixing of the asphalt with the aggregate under heated conditions, but when storing the asphalt pellets without aggregate the asphalt pellets tend to deform and/or break the coating under gravity due to about 30% free volume and form a non-flowable mix by interlocking the pellets, especially during warm weather. The two-step pellet forming process forms a brittle coating due to the addition of powder which can crack upon deformation thus exposing the tacky asphalt which can cause pellets to stick together. A solution to the interlocking problem is to place the pellets in a gradation of aggregate in which they will be used thus filling the voids between the pellets with aggregate and thus preventing pellet deformation while keeping the mix free flowing. However, the pellets generally cannot be stored together without the aggregate for any length of time without the deformation and aggregation of the asphalt occurring. By requiring the pellets of asphalt and the aggregate to be stored together, the cost of storage and material handling associated with the prepackaged asphalt mix grows substantially due to the size and weight of the aggregate involved as the aggregate is about 95% of the weight of the total mix, while the asphalt is about 5% of the weight.

Thus, a need exists for a hot mix asphalt system that can solve such difficult problems and facilitate quick preparations of asphalt mixes with materials that can be transported and stored at ambient temperature and can be later mixed together to produce hot mix at locations near the paving site.

SUMMARY

The present subject matter provides asphalt packets, asphalt mixture systems, and related methods. In particular, asphalt packets are provided that can be stored together at ambient temperatures separate from any aggregate used in a hot mix asphalt without fear of adhesion to other packets and aggregation that causes the asphalt packets to clump together. Methods related to the manufacture and use of the asphalt packets disclosed herein are also provided.

Thus, it is an object of the presently disclosed subject matter to provide asphalt packets, asphalt mixture systems that use the asphalt packets, and methods related to the use and manufacture of the asphalt packets. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 9A illustrates a schematic top plan view of another embodiment of a process for forming asphalt packet according to the present subject matter;

FIG. 9B illustrates a cross-sectional view of the embodiment of the process for forming asphalt packet according to FIG. 9A;

Figure 1:
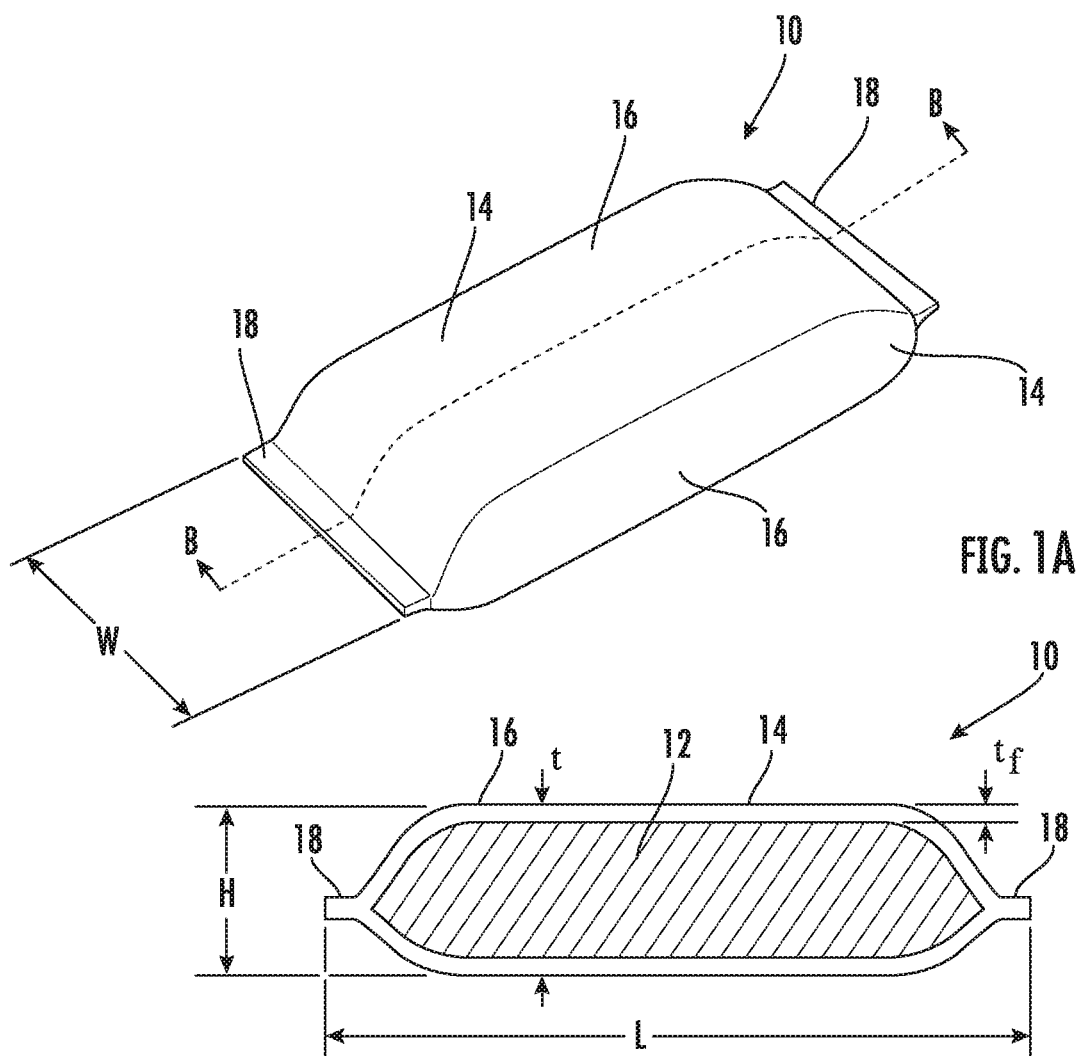
FIG. 1A illustrates a perspective view of an embodiment of an asphalt packet according to the present subject matter.
FIG. 1B illustrates a cross-sectional view of the embodiment of the asphalt packet according to FIG. 1A taken along the dashed line BB.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

The term "asphalt" is used herein to mean asphalt before it is mixed with any aggregate.

The term "asphalt composite" is used herein to mean asphalt that is melted and mixed with a polymer film outer coating of an asphalt packet. The asphalt composite is mixed with aggregate to form an asphalt mix.

The terms "asphalt mix" and its variations, including but not limited to, hot mix asphalt, warm mix asphalt, and cold mix asphalt, is used herein to mean a mixture of asphalt and/or asphalt composite with an aggregate gradation to form asphalt pavement used in constructing and repairing roads, parking lots, airfields and the like.

The term "warm mix asphalt" is used herein to mean hot mix asphalt which has been modified with additives to lower its paving temperature by 20° F. to 50° F. cooler than regular hot mix asphalt. The additive lowers the viscosity of the liquid asphalt.

The term "hot mix asphalt" is a generic term used herein to mean a traditional asphalt that is mixed with appropriate aggregate and heated to between about 280° F. and about 340° F. to make an asphalt mix.

The term "cold mix asphalt" is used herein to mean asphalt with additives, including but not limited to solvents, mixed therein to soften the asphalt at ambient temperatures for paving potholes with the additives being configured to at least partially evaporate allowing the asphalt mix formed with the cold mix asphalt to harden.

The term "asphalt pavement" is used herein to mean pavement and pavement repairs created by an asphalt mix.

The term "aggregate" is used herein to mean all the sizes of stone used in an asphalt mix which can include but is not limited to granular stone of size of about 200 mesh up to stones generally about ¾ of an inch across its longest axis.

The term "aggregate gradation" as used herein has the same meaning as the term "aggregate" and is used herein to mean the specific size distribution of stone used in an asphalt mix which can include but is not limited to granular stone of size of about 200 mesh up to stones generally about ¾ of an inch across its longest axis.

The terms of "degrade," "degradation," "degrading," or the like, as used herein in conjunction with the terms asphalt, asphalt composite, hot mix asphalt or asphalt mix are used to identify when asphalt loses its adhesive property and flexibility due to exposure to excess temperature that causes resins and petroleum by-products within the asphalt to evaporate from the asphalt which can eventually render the asphalt mix and pavement produced from the degraded asphalt unusable.

The terms "rectangular packet," "rectangular-shaped packet," or the like, as used herein in conjunction with the terms asphalt or asphalt packet means asphalt packets that have the general shape of a hyperrectangle having height dimension, a length dimension, and a width dimension.

Asphalt can generally be considered a combination of resins, oil and petroleum by-products, and asphaltenes. These combine in a colloidal system. Asphaltenes are not insoluble in non-polar solvents whereas the resins and petroleum by-products are (sometimes referred to as maltenes or petrolenes). When heated to high temperatures the resins and petroleum by-products are somewhat volatile and can be boiled off. This reduces the adhesive and flexible properties of the asphalt and can render it unusable if too much of the volatiles are boiled off due to excessive time and temperature. The flash point of asphalt is usually listed as 450° F. or more. This can vary according to the particular grade of asphalt. That is the temperature at which the volatiles can become combustible in the presence of a spark or flame. Therefore, the processing temperatures of asphalt are generally kept below 450° F.

Liquid asphalts are generally stored and transported at temperatures around about 300° F. to about 320° F. to keep them flowable. As seen from the Table 1, the viscosity of PG 76-22 asphalt is about 2600 cp at 290° F. and increases rapidly to over 6100 cp at 250° F. Generally, after combining with aggregate the maximum acceptable temperature for hot mix (asphalt mixed with aggregate) is 375° F. If heated above this temperature for very long, the asphalt will turn brown and loose its adhesive properties and its flexibility which will render it useless as a paving material.

A test to measure the loss of flexibility of the asphalt is described in ASTM D2872 as the Rolling Thin Film Oven test. This test measures the aging characteristics of the asphalt as an indication of its oil content and degree of degradation. In general, it is important to keep the temperature of the asphalt within about 320° F. when mixed with aggregate to minimize degradation and yet maintain its viscosity low enough for good compaction of the mix during the paving operation.

The use of proper sized and shaped packets which melt quickly when mixed with aggregate and heated in a rotating cylinder is important to coat the aggregate as it comes up to a paving temperature of about 300° F. to about 320° F. within minutes. This assures the production and performance of good mix and the minimization of loss of volatiles and consequent degradation of the asphalt hot mix.

To address the issues related to storage and preparation of a hot or warm mix asphalt, the present disclosure provides the formation of small packets of asphalt by extruding the molten asphalt through a forming dye and simultaneously co-extruding a polymeric coating around the body of the asphalt extrusion. An incremental length of that co-extruding asphalt polymer structure can be heat-sealed and then cut into segments, or packets, forming sealed ends and thus packets which fully encapsulate the sticky asphalt with a non-sticky robust polymeric coating which is flexible and will not crack upon deformation of the packet.

When cooled, this coating forms a rectangular shape for packaging, as shown in FIG. 3 (compared to pellets) with the bulk of the asphalt in the middle of the structure. This packet will allow the asphalt particles to be packaged in a container and will be free flowing. The non-tacky polymeric coating can be a material fully compatible with the asphalt when reheated, thus having no negative effect on the performance of the asphalt mixture. Also, the thickness of the polymeric coating can be controlled to provide robust packets of non-sticky material which are free flowing, separate, and can be easily uniformly mixed with the asphalt to form a high-quality asphalt hot mix.

In forming the asphalt packets, the size of the packets can be kept thin to create a higher surface to volume ratio and smaller cross-sectional area to allow the asphalt packet to melt quickly and coat the aggregate without burning or degrading the asphalt. It has been found that the higher the surface to volume ratio of the asphalt packets, the faster the melting rate.

In addition to HMA, the asphalt packets as disclosed herein can also be used in the production of warm mix asphalt. Using asphalt packets make the production of warm mix asphalt much easier than can be done with pelletized asphalt that has a hard powder coating because the formation of the packet is less affected by the viscosity of the asphalt than formation of the pellets and the polymer film coating is more flexible and will not crack upon deformation of the packet as compared to the hard powder coating used in pelletized asphalt. Warm mix asphalt is asphalt that has additives mixed in the liquid binder asphalt such that the viscosity of the hot liquid asphalt is lowered substantially while in the liquid phase thus allowing the liquid asphalt to better coat the aggregate at a lower temperature than hot mix asphalt by about 20° F. to 40° F. This saves energy and lowers volatile organic compounds and consequent smells of the hot mix asphalt. The warm mix liquid asphalt is easy to process into packets due to the process which is not as sensitive to melt viscosity. The asphalt packets disclosed herein can be used to store a warm mix asphalt material at ambient temperature which can later be heated and mixed to make a high quality warm mix asphalt.

To function properly in the formation of an asphalt mix, the asphalt packets can have a surface-to-volume ratio sufficiently high so that when the packets are mixed with the appropriate aggregate and exposed to heat, the asphalt melts quickly enough to liquefy and uniformly coat the aggregate as the composite mix reaches the full proper temperature. This ensures an even coating of the aggregate while not excessively degrading the asphalt due to thermal oxidation due to excessive heat.

The asphalt packets disclosed herein have advantages over asphalt pellets that include having a more flexible and robust coating or skin layer that will not crack if the asphalt packets are deformed while being packaged and stored. The thickness of the packets and the surface area to volume ratio can be better controlled to provide a more robust asphalt package that can liquefy and uniformly coat the aggregate as the composite mix reaches the full proper temperature. The asphalt packets can be packaged without the aggregate and packaged and stored to a under a reasonable weight pressure without interlocking or sticking together as compared to the asphalt pellets described above. Further, asphalt packets can be manufactured more simply with less complicated equipment and less expensively than asphalt pellets.

Unlike adhesive sachets that are used to hold polymeric adhesives, size and shape of asphalt packets are more critical due to the composition of the material being held in the packet. Polymeric adhesive sachets contain homogeneous polymeric adhesives that have homogeneous melting points, such that if a melting temperature is maintained will not degrade even after melting. Asphalt is comprised of compounds of asphaltenes and maltenes that can include a wide variety of different elements depending on the crude oil from which the asphalt derives, containing alcohol, carboxyl, phenolic, amine, thiol, and other functional groups. Asphalt may be regarded as colloids of asphaltene micelles dispersed in maltenes. Due to the composite nature of asphalt, exposure to a heat source that is hot enough to melt the asphalt without igniting the asphalt can begin to degrade the asphalt if the exposure is too long in duration. This degradation can be at least partly due to different compounds with different properties from other compounds within the composition of the asphalt beginning to deteriorate and burn off as the melted portion of the asphalt is continued to be exposure to the high heat to melt the unmelted portions of the asphalt packet. If the temperature from the heat source is too high, the melted asphalt heats up too much while the rest of the asphalt packet is still being melted, the portions of the asphalt that have already melted will begin to degrade. This problem can be compounded if the asphalt packet is too large. If the temperature from the heat source is too low, the melt time of the packets increases too much in the rotating mixer as the asphalt packets are heated with the aggregate, the substantially longer melt time of the lower surface/volume ratio packets (i.e., larger packets) will cause coagulation of the packets into large sticky balls due to excessive melt time and insufficient heat and thus consequent longer residence time required to heat the mix. This coagulation will prevent uniform coating of the aggregate and thus unacceptable quality of hot mix.

Also, since the relative weight percent of the asphalt to aggregate in the mix is about 6 percent, then at 6 percent by weight, since the aggregate specific gravity is heavier (about 2.2) than the asphalt (about 1.0), the volume of asphalt is about 12.4 percent of the asphalt/aggregate mix by volume. Therefore, as the weight per packet decreases (i.e., packets with higher surface area/volume ratio), the number of packets increases to maintain the 12.4 percent volume. This larger number of the smaller packets will result in a more uniform mix as well as a faster melting time as compared to larger asphalt packets having lower surface area/volume ratio. Therefore, there is an optimum range of surface/volume ratio of the packets of approximately 10 to 25 or greater to create uniform hot mix in the rotating mixer.

Referring to FIGS. 1A and 1B, a non-tacky asphalt packet generally designated 10, is provided. The non-tacky asphalt packet can comprise an inner volume of asphalt 12 and a polymer film outer coating 14 encapsulating the volume of the asphalt 12. The polymer film outer coating 14 can form an outer surface 16 of the asphalt packet 10. The polymer film outer coating 14 can comprise a polymer that is non-tacky at ambient temperatures, for example, between about 45° F. and about 120° F. The asphalt packet 10 can be produced in a variety of ways as explained further below. In some embodiments, as shown in FIGS. 1A and 1B, the asphalt packet 10 can be formed through a coextrusion process that extrudes the polymer film outer coating 14 around the asphalt 12 that includes a sealing process that forms ends 18 of the asphalt packet 10 that comprise the polymer film outer coating 14 to seal the asphalt 12 within the asphalt packet 10. The asphalt packet 10 can thus have a height H, a width W, a length L. As shown in FIG. 1B, the height H of the asphalt packet 10 can form a thickness t of the smallest dimensional distance. The thickness t of the smallest dimensional distance can be the thickness of any dimension that has the smallest dimensional measurement of the asphalt packet 10. The rate at which the asphalt packet 10 will melt without degrading within an asphalt mixer can be at least partially dependent on this measurement.

The asphalt 12 can comprise the majority of the weight of the asphalt packet such that the properties of asphalt advantageous for producing asphalt pavement are not compromised. For example, in some embodiments, the asphalt 12 can comprise at least about 85% of the non-tacky asphalt packet by weight. In some embodiments, the asphalt 12 can comprise at least about 90% of the non-tacky asphalt packet by weight. In some embodiments, the asphalt 12 can comprise virgin asphalt material, for example when making a hot mix asphalt for use in asphalt pavement that needs to have a high strength to withstand high weight pressures and/or repeated use such as in airfields and interstate highways. In some embodiments when the asphalt packets are to be used in a warm asphalt mix, the asphalt can comprises a warm mix asphalt material.

The polymer film outer coating 14 is compatible with the asphalt 12 such that as the polymer film outer coating 14 is melted with the asphalt 12, an asphalt composite is formed, the polymer of the polymer film coating 14 does not diminish the performance of the asphalt composite formed by the mixture of the polymer film outer coating 14 and the asphalt 12. The polymer film outer coating 14 can thus comprise a compatible non-tacky polymeric coating which is fully compatible with the asphalt 12 when the polymer film outer coating 14 and the asphalt 12 are melted into liquid form. For example, the polymer film outer coating can comprise ethylene-vinyl acetate (EVA) or polymeric blends that include EVA, styrenic block copolymers (SBC) or polymeric blends that include SBC, styrene-butadiene-styrene (SBS) block copolymers or styrene-ethylene-butylene-styrene (SEBS) polymers or polymeric blends that include SBS and/or SEBS. Further, some combination polymeric blends of these polymers listed above can used as the polymer film outer coating 14. The polymer film outer coating 14 can have a thickness $t_f$ that can prevent the asphalt 12 from leaking therethrough even when placed under weighted pressure and keeps the asphalt contained within the polymer film outer coating 14. For example, in some embodiments, the polymer film outer coating 14 can have a thickness $t_f$ of between about 0.001 inches and about 0.01 inches (between about 1 mil and about 10 mils).

The asphalt packet 10 comprising the polymer film outer coating 12 and the volume of asphalt 12 can have a surface-to-volume ratio that permits the complete melting of the polymer film outer coating 14 and the asphalt 12 upon reaching a melting point of asphalt 12 in a range of time such that the polymer film outer coating 14 and asphalt 12 liquefy without degradation of the asphalt composite during a liquefaction process.

For example, the surface-to-volume ratio of the asphalt packet 10 can be such that, when a plurality of the non-tacky asphalt packets 10 are dispersed in an aggregate mixture in a mixer and heated to a mixing temperature, the plurality of asphalt packets 10 melt and coat the aggregate uniformly with the asphalt composite as the aggregate reaches the maximum mix temperature as measured at the asphalt mix and prior to degradation of the asphalt composite due to prolonged exposure to excessive temperature. For example, in some embodiments, the mix temperature can range between about 260° F. and about 340° F. In some embodiments, the mix temperature can range between about 280° F. and about 320° F. The range of time that the asphalt can be exposed to be heated to such temperatures and thorough melt before degradation occurs can vary. In some embodiments, the range of time can be between about 20 seconds and about five (5) minutes as explained further below.

To allow for a thorough liquefaction of the asphalt packet without degradation of the asphalt composite formed, the surface-to-volume ratio of the asphalt packets 10 can be at least about 10. In some embodiments, the surface-to-volume ratio of the asphalt packets 10 can be between about 15 and about 30. In some embodiments, the surface-to-volume ratio of the asphalt packets 10 can be greater than about 17. In some embodiments, the surface-to-volume ratio of the asphalt packets 10 can be greater than about 20. At that temperature and surface area-to-volume ratio, the packet can be fully melted and is available to uniformly coat the aggregate in the rotating drum to form the required hot mix for paving.

In combination with the surface-to-volume ratio, the thickness as measured across the smallest dimensional distance of the asphalt packet 10 can impact the ability of the asphalt packet to thoroughly melt before degradation occurs. Thus, depending on the orientation of the packet, the thickness as measured across the smallest dimensional distance of the asphalt packet can be a height, length or width of some asphalt packets or a diameter of some asphalt packets depending on the shape of the asphalt packet. In the embodiment shown in FIGS. 1A and 1B, as stated above, the height H of the asphalt packet 10 comprises the thickness t of the smallest dimensional distance. While the asphalt packet 10 is not exactly a rectangular-shaped packet, the measurements of the surface-to-volume ratio of the packet 10 are close enough in calculation with the surface-to-volume ratio of a similarly dimensioned rectangular-shaped packet with the same height, length and width that, for the purposes of this disclosure, the asphalt packet 10, is generally considered a rectangular shaped asphalt packet.

Figure 2:
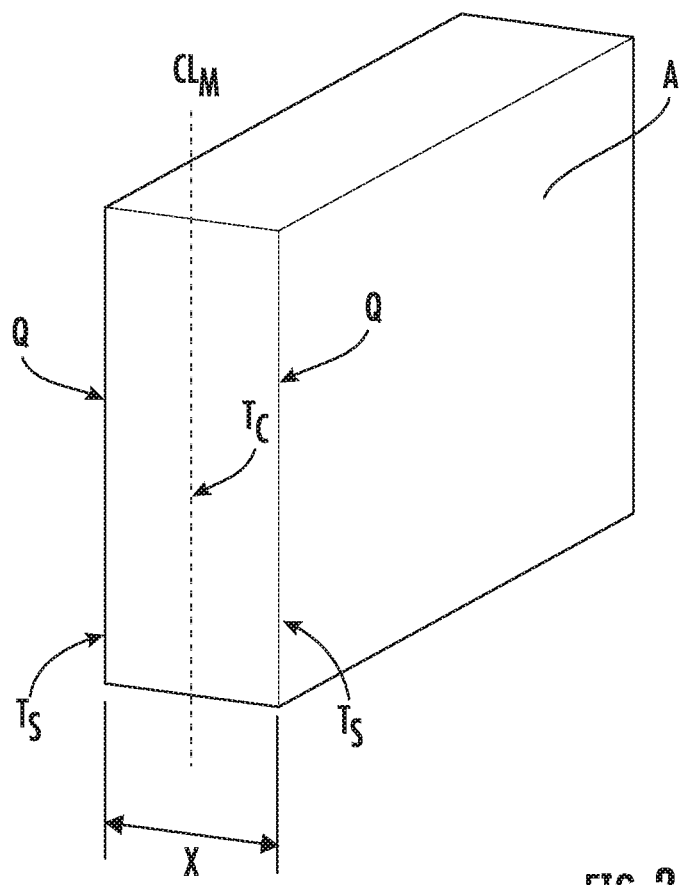
FIG. 2 illustrates a perspective view of another embodiment of an asphalt packet showing the elements of heat transfer that determine the effectiveness of the asphalt packet according to the present subject matter.

When the asphalt packets at ambient temperature are exposed to hot air in a rotating mixing cylinder its temperature will begin to rise according to the laws of heat transfer. Assuming the convective transfer is large, the limiting factor to heating the packets quickly is the conductive heat transfer. Referring to FIG. 2, an asphalt packet 10 is provided that can help explain conductive heat transfer that can help determine the size and shape of the asphalt packet that will prevent the asphalt from degrading or burning while the asphalt inside melts. The packet 10 will conduct heat from the hot gas and also the contact with the hot rotating cylinder and heated aggregate in accordance with Equation (A) expressed as $$\dot{Q}=K \times A(T_s-T_c/x/2) \qquad \text{Equation (A)}$$

Where:
  $\dot{Q}$=Heat Transfer to Packet on Each Side (BTU/minute)
  K=Thermal Conductivity of Asphalt
  A=Area
  x=Thickness of Dimension having the Smallest Dimensional Distance
  $T_s$=Temperature of Surface
  $T_c$=Temperature of Center The amount of heat required to heat the packet from ambient to about 320° F. is expressed by the equation B:

$$Q=M \times Cp \times \Delta T \qquad \text{Equation (B)}$$

Where:
  Q=BTU
  M=Mass of the Packet
  Cp=Specific Heat of Asphalt
  $\Delta T$=Temperature Change (ending temperature minus beginning temperature for example 320° F.-80° F.)

As seen from Equation A, the smaller the minimum dimension "x" and the larger the area, A, the higher the rate of heat transfer, Q, and consequently the less time is required to provide the total BTUs (Q) from Equation B required to reach the 320° F. service temperature across the whole asphalt packet 10.

The asphalt packets 10 can be different shapes to achieve the desired surface area to volume ratio. For example, the shape of the asphalt packets 10 can be spherical, ellipsoidal, ovoidal, rectangular, rectangular, cylindrical with tapered ends, or the like. For example, the asphalt packets 10 can be rectangular with rounded or tapered sides and ends, such as a pillow-shape or a sachet. For some embodiments of the asphalt packet 10 that are in the shape of a sachet such as those shown in FIG. 1, the asphalt packet 10 can have a width of about 0.5 inches, a height of about 0.2 inches, and a length of about 0.75 inches so that the smallest dimensional distance is the height. For some embodiments of the asphalt packet 10 that are in the shape of a sachet, the asphalt packet 10 can have a width of about 0.5 inches, a height of about 0.15 inches, and a length of about 0.75 inches. For some embodiments of the asphalt packet 10 that are in the shape of a sachet, the asphalt packet 10 can have a width of between about 0.3 and about 0.5 inches, a height of about 0.1 and about 0.2 inches, and a length of about 0.50 to about 1.5 inches. For example, in one embodiment, the asphalt packet 10 can have a surface area to volume ratio of 24 and a width W of about 0.50 inch by length L of about 1.50 inches and a thickness of about 0.120 inches.

Figure 3A:
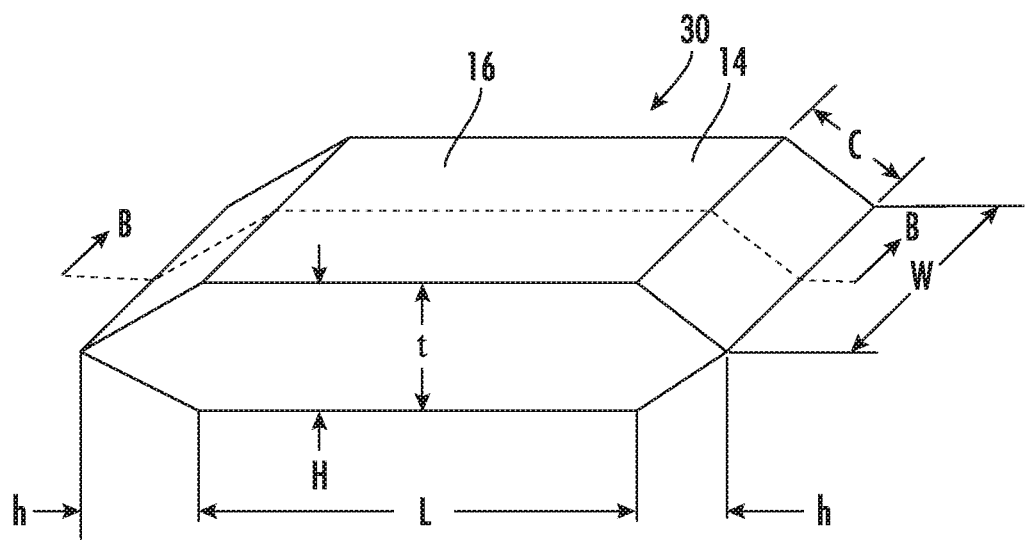
FIG. 3A illustrates a perspective view of an embodiment of a polygonal shaped asphalt packet according to the present subject matter.
Figure 3B:
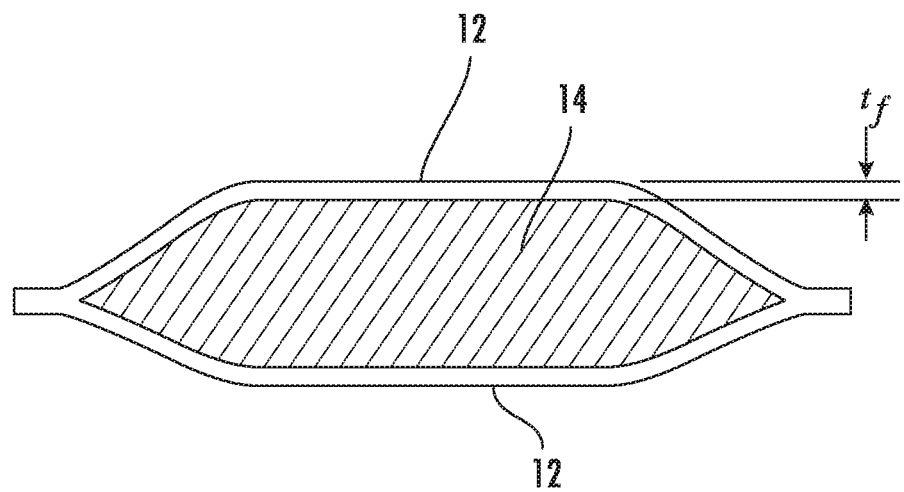
FIG. 3B illustrates a cross-sectional view of the embodiment of the asphalt packet according to FIG. 3A taken along the dashed line BB.

Other examples of differently shaped asphalt packets are shown in FIGS. 3A-7B and examples of how the surface area to volume for each are provided. Referring to FIGS. 3A and 3B, the sachet-shaped asphalt packet 30 is provided that can also comprise an inner volume of asphalt 12 and a polymer film outer coating 14 encapsulating the volume of the asphalt 12. The polymer film outer coating 14 can form an outer surface 16 of the sachet-shaped asphalt packet 30. The polymer film outer coating 14 can have a thickness $t_f$ between about 0.001 inches and about 0.01 inches (between about 1 mil and about 10 mils).

The surface area-to-volume ratio for a sachet-shaped asphalt packet 30 can be calculated based on the equations (C), which is derived from equations (D) and (E) below.

$$SA/V = \frac{2[W \times L + H \times L + 2(C \times W) + h \times H]}{W \times H \times (h + L)} \quad \text{Equation (C)}$$

$$SA = 2(W \times L) + 2(H \times L) + 4(C \times W) + 2(h \times H) \quad \text{Equation (D)}$$

$$V = (W \times H)(h + L) \quad \text{Equation (E)}$$

Where:
SA=Surface Area
V=Volume
W=Width of the Sachet-Shaped Asphalt Packet 40
L=Length of the Sachet-Shaped Asphalt Packet 40
H=Height of the Sachet-Shaped Asphalt Packet 40
C=Length of the Sloping End Portions of the Sachet-Shaped Asphalt Packet 40
h=Linear Length of the End Portions of the Sachet-Shaped Asphalt Packet 40

Figure 4A:
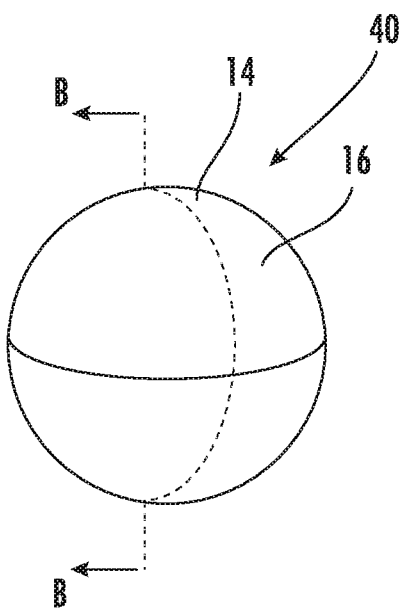
FIG. 4A illustrates a perspective view of an embodiment of a spherical shaped asphalt packet according to the present subject matter.
Figure 4B:
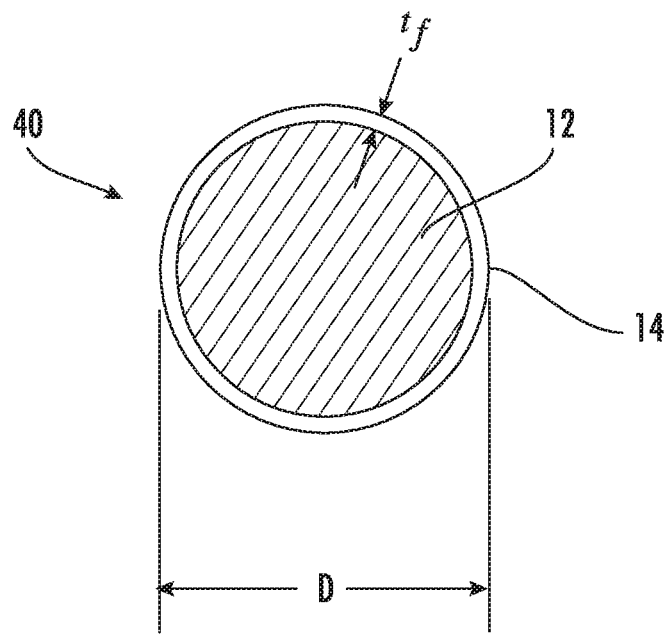
FIG. 4B illustrates a cross-sectional view of the embodiment of the asphalt packet according to FIG. 4A taken along the dashed line BB.

Referring to FIGS. 4A and 4B, the spherical-shaped asphalt packet 40 can comprise an inner volume of asphalt 12 and a polymer film outer coating 14 encapsulating the volume of the asphalt 12. The polymer film outer coating 14 can form an outer surface 16 of the spherical-shaped asphalt packet 40. The polymer film outer coating 14 can have a thickness $t_f$ between about 0.001 inches and about 0.01 inches (between about 10 mils and about 100 mils). The surface area-to-volume ratio for a spherical-shaped asphalt packet 40 can be calculated based on the equation (F) below.

$$SA/V = \frac{4 \times \pi \times r^2}{4/3 \times \pi \times r^3} = \frac{3}{r} \quad \text{Equation (F)}$$

Where:
SA=Surface Area
V=Volume
r=The Radius of the Spherical Packet 30 where the Radius is equal to one half of the Diameter D The surface-to-volume ratio of the spherical-shaped asphalt packet 30 can vary depending on the diameter D of the spherical-shaped asphalt packet 30. Examples of such surface-to-volume ratio of the spherical-shaped asphalt packet 30 are shown in Table 1.

TABLE 1

Surface-to-Volume Ratio of Spherical-Shaped Asphalt Packets

| Diameter of Spherical-Shaped Asphalt Packets (inches) | Surface-to-Volume Ratio (1/inch) |
|---|---|
| 0.125 | 48 |
| 0.250 | 24 |
| 0.50 | 12 |

Figure 5A:
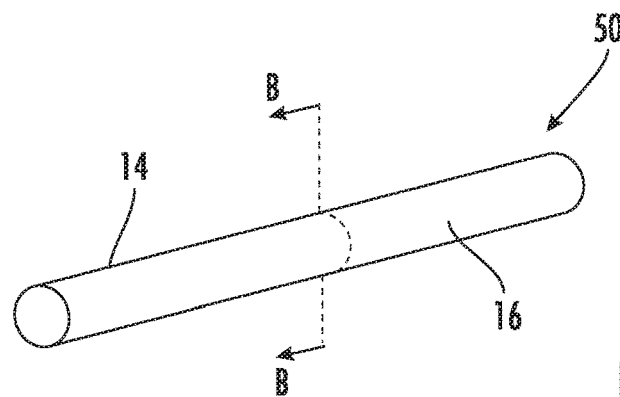
FIG. 5A illustrates a perspective view of an embodiment of a cylindrical shaped asphalt packet according to the present subject matter.
Figure 5B:
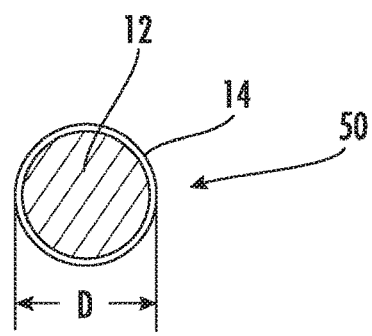
FIG. 5B illustrates a cross-sectional view of the embodiment of the asphalt packet according to FIG. 5A taken along the dashed line BB.

Referring to FIGS. 5A and 5B, the cylindrical-shaped asphalt packet 50 can comprise an inner volume of asphalt 12 and a polymer film outer coating 14 encapsulating the volume of the asphalt 12. The polymer film outer coating 14 can form an outer surface 16 of the cylindrical-shaped asphalt packet 50. The surface area-to-volume ratio for a cylindrical-shaped asphalt packet 50 can generally be calculated based on the equation (G) below.

$$SA/V = \frac{4}{D} \quad \text{Equation (G)}$$

Where:
SA=Surface Area
V=Volume
D=The Diameter of the Cylindrical-Shaped Asphalt Packet 50

The surface-to-volume ratio of the cylindrical-shaped asphalt packet 50 can vary depending on the diameter D of the cylindrical-shaped asphalt packet 50. Examples of such surface-to-volume ratio of the cylindrical-shaped asphalt packet 50 are shown in Table 2.

TABLE 2

Surface-to-Volume Ratio of Cylindrical-Shaped Asphalt Packets

| Diameter of Cylindrical-Shaped Asphalt Packets (inches) | Surface-to-Volume Ratio (1/inch) |
|---|---|
| 0.125 | 32 |
| 0.250 | 16 |
| 0.50 | 8 |

Figure 6A:
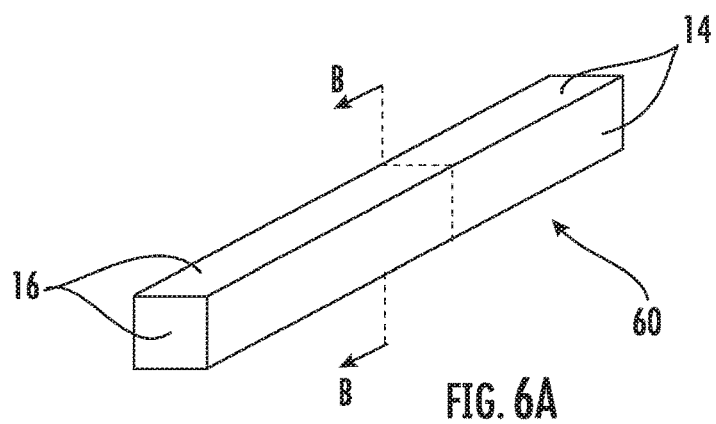
FIG. 6A illustrates a perspective view of an embodiment of a square-bar shaped asphalt packet according to the present subject matter.
Figure 6B:
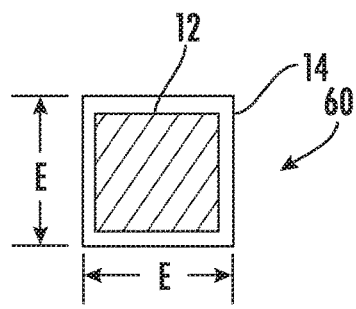
FIG. 6BB illustrates a cross-sectional view of the embodiment of the asphalt packet according to FIG. 6A taken along the dashed line BB.

Referring to FIGS. 6A and 6B, the square bar-shaped asphalt packet 60 can comprise an inner volume of asphalt 12 and a polymer film outer coating 14 encapsulating the volume of the asphalt 12. The polymer film outer coating 14 can form an outer surface 16 of the square bar-shaped asphalt packet 60. The surface area-to-volume ratio for a square bar-shaped asphalt packet 60 can generally be calculated based on the equation (H) below.

$$SA/V = \frac{4}{E} \quad \text{Equation (H)}$$

Where:
SA=Surface Area
V=Volume
E=The Length of Each Side of the Square Bar-Shaped Asphalt Packet 60

The surface area-to-volume ratios calculations a similar to the cylindrical-shaped asphalt packet 50 for different sized packets as shown in Table 3.

TABLE 3

Surface-to-Volume Ratio of Square Bar-Shaped Asphalt Packets

| Diameter of Square Bar-Shaped Asphalt Packets (inches) | Surface-to-Volume Ratio (1/inch) |
|---|---|
| 0.125 | 32 |
| 0.250 | 16 |
| 0.50 | 8 |

Figure 7A:
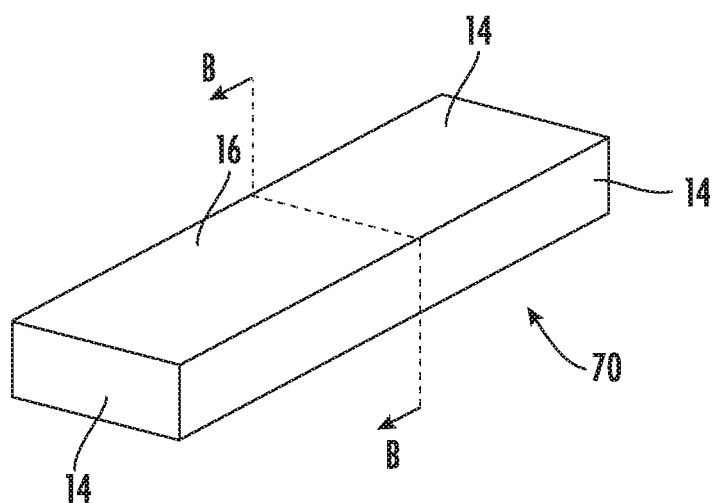
FIG. 7A illustrates a perspective view of an embodiment of a rectangular shaped asphalt packet according to the present subject matter.
Figure 7B:
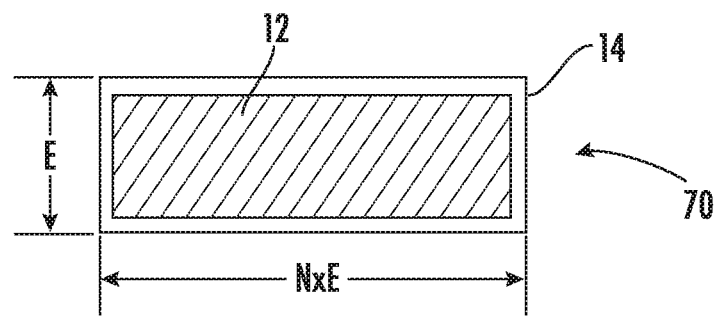
FIG. 7B illustrates a cross-sectional view of the embodiment of the asphalt packet according to FIG. 7A taken along the dashed line BB.

Referring to FIGS. 7A and 7B, the rectangular-shaped asphalt packet 70 can comprise an inner volume of asphalt 12 and a polymer film outer coating 14 encapsulating the volume of the asphalt 12. The polymer film outer coating 14 can form an outer surface 16 of the rectangular-shaped asphalt packet 70. The surface area-to-volume ratio for a rectangular-shaped asphalt packet 70 can generally be calculated based on the equation (H) below.

$$SA/V = \frac{2(N+1)}{N \times E} \quad \text{Equation (H)}$$

Where:
SA=Surface Area
V=Volume
E=The Width of Shorter Side of the Rectangular-Shaped Asphalt Packet 70
N=The Ratio of the Width of the Longer Side divided by the Width of the Shorter Side of the Rectangular-Shaped Asphalt Packet 70
N×E=The Width of Longer Side of the Rectangular-Shaped Asphalt Packet 70

Referring back to FIG. 1, the surface-to-volume ratio of the asphalt packets 10 can be such that the asphalt packet 10 fully melts within five minutes when exposed to a heat of up to about 450° F. In some embodiments surface-to-volume ratio of the asphalt packets 10 can be such that the asphalt packet 10 fully melts within in two minutes when exposed to a heat of up to about 450° F. In some embodiments, the surface-to-volume ratio of the asphalt packets 10 can be such that the asphalt packet 10 fully melts within in one minute when exposed to a heat of up to about 450° F. In some embodiments, surface-to-volume ratio of the asphalt packets 10 can be such that the asphalt packet 10 fully melts within 30 seconds when exposed to a heat of up to about 450° F.

The polymer film outer coating 14 can have a thickness such that a plurality of the asphalt packets 10 are storable at ambient temperature for at least 5 years without degrading the polymer film outer coating 14 and the asphalt 12 to permit the asphalt packets 10 to still be dispersable into a heater or a heated mixer in a friable manner. In this manner, even after storage, a plurality of the asphalt packets 10 can be mixed with an appropriate aggregate to form a mix gradation with a % weight ratio for the asphalt packets 10 being about 3% to about 10% of weight of the mix gradation and heated to a mix temperature of between about 260° F. to about 340° F. The plurality of asphalt packets liquefy and uniformly coat the aggregate to produce a high quality asphalt hot mix for paving roads and airfields. The asphalt packets are mixable with an appropriate aggregate and heated in an appropriate mixer can produce high quality hot mix in remote locations in less than about 20 minutes. For example, in some embodiments, a plurality of the asphalt packets 10 can be packed at least 20 inches deep in a container under ambient conditions and can then be stored for up to 1 year or more with the plurality of asphalt packets 10 maintaining their integrity without the polymer film outer coatings 14 of the asphalt packets 10 being compromised.

Thus, as disclosed herein, an asphalt packet 10 can have a non-tacky outer surface and a size and shape that allows the asphalt packet 10 to fully melt into an asphalt composite before degradation of the asphalt or asphalt composite begins. The asphalt packet 10 can comprise an asphalt 12 that is at least 85% by weight of high-quality virgin asphalt that comprises an inner volume and a polymer film outer coating 12 that encapsulates the volume of the asphalt. The polymer film outer coating 10 can be non-tacky at ambient temperatures and can permit stacking of a plurality of asphalt packets under weight without causing the packets to agglomerate. The polymer film outer coating 14 and the volume of asphalt 12 can have a size and shape to create a surface-to-volume ratio that permits the complete melting of the polymer film outer coating 14 and the asphalt 12 into a liquid form of an asphalt composite when heated to between about 260° F. and about 340° F. before the asphalt composite begins to degrade. These asphalt packets 10 can fully melt within five minutes when exposed to a heat of up to about 450° F. In some embodiments, these asphalt packets 10 can fully melt within in two minutes when exposed to a heat of up to about 450° F. In some embodiments, these asphalt packets 10 can fully melt within in one minute when exposed to a heat of up to about 450° F. In some embodiments, these asphalt packets 10 can fully melt within 30 seconds or less when exposed to a heat of up to about 450° F.

Thus, as provided above, the non-tacky asphalt packet can have a surface layer that comprise a continuous layer of polymer compatible with the asphalt, and which has a surface-to-volume ratio which in the presence of heat makes the asphalt melt in an adequately short time such that when dispersed in an aggregate mixture allows the asphalt to melt and the asphalt to coat the aggregate uniformly as the aggregate reaches the maximum mix temperature, and prior to degradation of the asphalt due to excessive temperature.

The asphalt packet can comprises a non-tacky outer coating layer that envelopes an asphalt preparation that comprises the center of the asphalt packet. The asphalt packet can have a surface-to-volume ratio greater than about 10. The non-tacky outer coating layer can comprise a compatible non-tacky polymeric coating of one or more thermoplastic polymers which is fully compatible with the asphalt liquid when melted. For example, the one or more thermoplastic polymers can be meltable polymers in a temperature range of between about 200° F. and about 300° F. In some embodiments, the one or more thermoplastic polymers that can be used as the outer coating layer can comprise at least one of ethylene-vinyl acetate (EVA), styrenic block copolymers (SBC), styrene-butadiene-styrene (SBS) block copolymers and styrene-ethylene-butylene-styrene (SEBS) polymers, such as those sold under the tradename of KRATON™.

The non-tacky outer coating layer fully encapsulates the tacky asphalt with the continuous non-tacky outer coating layer making the structure non-tacky at ambient temperature. The non-tacky outer coating layer can comprise a small percentage of the overall mass of the asphalt packet with at least about 80% of a standard asphalt material comprising the majority of the majority of the mass of the asphalt packet. When uniformly dispersed in an appropriate gradation of stone aggregate and can be stored at ambient temperature for at least 5 years and then be dispersed into a heater in a free-flowing manner.

When mixed with an appropriate aggregate gradation with a % weight ratio of about 3% to about 10%, the asphalt packets can be uniformly mixed and heated to a mix temperature of about 280° F. to 320° F. to produce a high quality asphalt hot mix which can be used for paving roads and airfields. By using asphalt packets as described herein with the correct aggregate mixture and heated in an appropriate mixer, a high-quality hot mix asphalt can be produced in remote locations in less than 20 minutes. The asphalt packets can be packaged in containers at least 20 inches deep under ambient conditions and remain free flowing for 1 year or more.

The proper aggregate gradation can be produced either in pre-measured batch form or at the mix site. A precisely accurate ratio of asphalt packets must be mixed with the aggregate in a well distributed mix. The packets should be in free-flowing form to accommodate a well distributed accurate ratio of the mixture. By free-flowing, it is meant that when a plurality of packets is distributed into a heated mixer that they do not stick together and tumble over each other as the asphalt packets are poured from a container into a mixer. The asphalt/aggregate mixture can be heated in the heated mixer to a uniform mix temperature of about 300° F. When heating in the mixer, the asphalt packets melt at a specific rate so as to properly coat the full aggregate gradation without overheating. If overheating occurs, it will cause the asphalt binder to oxidize and degrade thus loose part of its adhesive and flexibility properties, which are required for a good asphalt mix to produce a good quality asphalt pavement.

Part of the importance of this melting rate is related to the steep temperature viscosity curve of the asphalt as illustrated in the Table 4 below. Low viscosity is required for proper coating and the low viscosity is achieved in the range of about 290° F. to 300° F. as shown below for the PG 76-22 grade of asphalt commonly used for airfield pavement and repairs.

TABLE 4

Temperature Relative to Viscosity of PG 76-22 Grade Asphalt

| Temperature (° F.) | Viscosity (Centipose) |
|---|---|
| 180 | 200,000 |
| 200 | 74,000 |
| 250 | 6,100 |
| 290 | 2,600 |

In order to function properly in the mix, the asphalt packets can have specific properties which allow them to produce high quality hot mix. For example, the packets can be composed of at least about 85% to about 90% of an approved grade of asphalt and be designed according to a proper Job Mix Formula (which is an industry term that specifies the specific aggregate gradation and the percentage asphalt for a specific asphalt pavement design) for good pavement performance. The outer surface of the packets can be non-tacky so as to be easily handled and to disperse well within the aggregate gradation at ambient temperature. The asphalt packets should melt within the time frame required to heat the aggregate in a heated mixer such that, as the aggregate reaches its working temperature of about 300° F., the asphalt viscosity is reduced to a sufficiently low value to provide good and uniform coating for the aggregate from fines to coarse stone sizes. The asphalt packets should melt sufficiently within a proper time to reduce the asphalt viscosity to a low value as shown above. The asphalt packets must be thermally stable with a non-tacky surface so as to withstand storage long term at ambient temperatures without sticking together or flowing together and to remain free-flowing for use in an appropriate heated mixer. Depending on how the asphalt packets are packaged, the asphalt packets should be able to withstand storage long term under weigh pressure and at ambient temperatures without sticking together or flowing together.

In order to meet the criterion of melting at the rate the aggregate is heating up, which requires a short melting time, it was discovered that the asphalt packets must be small in size and consequently have a large surface to volume ratio to melt rapidly to a low viscosity as the aggregate heats up to the working temperature.

Asphalt packets of different sizes were tested. Asphalt packets were fabricated comprising a thin layer of polyethylene plastic that formed the outer surface of the asphalt packet. These asphalt packets had a polymer film outer coating having a film thickness of about 0.01 inches (about 1 mils) and comprised an inner volume of PG 76-22 asphalt. Before testing, the asphalt packets were cooled to about 62° F. Each asphalt packet was attached to a vertical board. For the rectangle shaped asphalt packets tested, the asphalt packets with the longest dimension (length) extended parallel to the surface of the vertical board with the shortest dimension (height, which, in these embodiments, comprise the thickness of the smallest dimensional distance) positioned perpendicular to the surface of the vertical board. A commercial butane torch was positioned about 7 inches from each sample asphalt packet such that the flame of the torch was about perpendicular to the surface of the vertical board. The melting times were measured from the beginning the heat cycle, when the flame of the torch was lit, until the asphalt was fully melted. The results are provided below in Table 5. As seen from the above data, the smaller asphalt packet shape, i.e., higher surface area/volume, tend to melted faster.

TABLE 5

Volumetric Dimensions of Asphalt Container Shape Relative to Melt Time

| Asphalt Container Shape | Volumetric Dimensions* in inches (D**) or (H × W × L)*** | Melt Time (seconds) | Surface Area/ Volume Ratio (1/inch) |
|---|---|---|---|
| Spherical Packet | 0.25 | 21 | 24.0 |
| Rectangular Packet | ⅛ × ½ × ¾ | 50 | 22.6 |
| Rectangular Packet | ¼ × ½ × ¾ | 114 | 14.7 |
| Rectangular Packet | ⅜ × ½ × ¾ | 127 | 12 |
| Rectangular Packet | ½ × ½ × ¾ | 151 | 10.7 |
| Cube Packet | 1 × 1 × 1 | 583 | 6 |

*Dimensions in inches are provided for Diameter or *Height by Width by Length for the various shaped asphalt packets.

Thus, referring back to FIG. 1, in some embodiments, the asphalt packet 10 can have a height of about ⅛ inches (about 0.125 inches), a width of about ½ of an inch (about 0.5 inches), and a length of about ¾ inches (about 0.75 inches) such that surface area-to-volume ratio is about the 22.6 and the thickness (the height in such an embodiment) of smallest dimensional distance is about 0.125 inches. For some embodiments, the asphalt packet 10 can have a height of about ¼ inches (about 0.25 inches), a width of about ½ of an inch (about 0.5 inches), and a length of about ¾ inches (about 0.75 inches) such that surface area-to-volume ratio is about the 14.7 and the thickness (the height in such an embodiment) of smallest dimensional distance is about 0.25 inches. For some embodiments, the asphalt packet 10 can have a height of about ⅜ inches (about 0.375 inches), a width of about Y of an inch (about 0.5 inches), and a length of about ¾ inches (about 0.75 inches) such that surface area-to-volume ratio is about the 12.0 and the thickness (the height in such an embodiment) of smallest dimensional distance is about 0.375 inches. For some embodiments, the asphalt packet 10 can have a height of about ½ inches (about 0.5 inches), a width of about ½ of an inch (about 0.5 inches), and a length of about ¾ inches (about 0.75 inches) such that surface area-to-volume ratio is about the 10.7 and the thickness (either the height or the width in such an embodiment) of smallest dimensional distance is about 0.5 inches.

Figure 10:
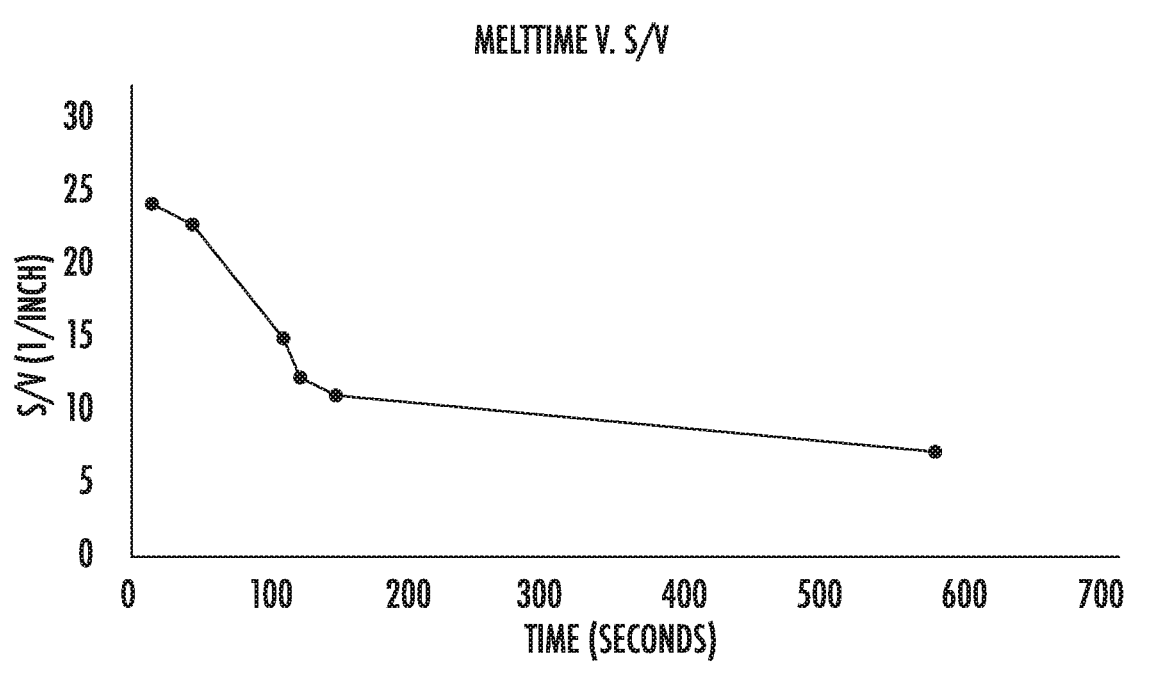
FIG. 10 illustrates a graph of asphalt packet melt times versus surface-to-volume ratio of the asphalt packets based on the measurements presented in Table 5 below.

Referring to FIG. 10, the graph provided there are based on the measurements presented in Table 5 above, where the surface/volume ratio of the asphalt packet is plotted against the melt time of the asphalt packets based on the testing methods described above. The graph illustrates that as the surface/volume ratio of the asphalt packet decreases (i.e., as the packet size increases), the melt time increases almost exponentially. The data for table is taken by holding the temperature of the heat supply constant at about 400° F. It the heat temperature is increased too high, above the ignition temperature of the asphalt, about 450° F. in many cases, the asphalt will ignite and catch on fire as well as degrade rapidly. Therefore, the maximum temperature of the heat is limited and as seen in FIG. 10 the melt time increases dramatically as the surface to volume ratio decreases below 10. Exposure to a heat source that is hot enough to melt the asphalt without igniting the asphalt will begin to degrade the asphalt if exposure is too long in duration. This is at least partly due to the petroleum by-products within the composition of the asphalt begin to deteriorate and burn off as the melted portion of the asphalt is continued to be exposure to the high heat to melt the unmelted portions of the asphalt packet. The melt time of the 1 inch×1 inch×1 inch cube while being exposed to the heat source for over 8 minutes resulted in a degradation of the asphalt In the test results presented above, for the asphalt packets having a melting time under the temperature conditions of the test of about three (3) minutes or less resulted the asphalts that did not show signs of degradation. For similar mixing environments where enough heat is provided to sufficiently melt the asphalt without excessive coagulation but not too high of a temperature to ignite the asphalt, it is believed that a melt time of about five (5) minutes or under can provide a uniform coating of aggregate without degradation of the asphalt occurring.

Since the relative weight percent of the asphalt to aggregate in the mix is about 6 percent, then at 6 percent by weight, since the aggregate specific gravity is heavier (about 2.2) than the asphalt (about 1.0), the volume of asphalt is about 12.4 percent of the asphalt/aggregate mix by volume. Therefore, as the weight per packet decreases, the number of packets increases to maintain the 12.4 percent volume. For example, in FIG. 10, the 12.4 percent asphalt in the mix for a 1-inch cube of asphalt (1.0 cubic inch) equates to about 21.3 packets (0.047 cubic inch each) of the ⅛×½×¾ packet shown in Table 5. This larger number of the smaller packets will result in a more uniform mix with less opportunity for degradation of the asphalt as it melts as well as a faster melting time. Therefore, there is an optimum range of surface/volume ratio of the packets of approximately 10 to 25 or greater to create uniform hot mix in the rotating mixer.

To meet the percentage of approved grade of asphalt that can be easily handled and disperses well while still being able to be stored properly under ambient conditions, the asphalt packets can comprise a non-tacky coating which, when melted, forms a compatible part of the final mixture while not degrading the performance of the asphalt binder in the pavement. To meet the requirement of being stored at ambient temperature and under pressure created by the weight of the asphalt packets without aggregate while still being free flowing when need to later be combined with aggregate, an asphalt packet which comprises asphalt that is fully enclosed by a fully continuous, flexible non-tacky coating that is compatible with the asphalt has been developed. The asphalt packet is fabricated such that the packet size and surface to volume ratio is within a range of meeting the fast melting properties required in the process such that when heated with the aggregate provides a high quality hot mix at about 300° F. without exposing the asphalt to excessive heat for extended time which causes oxidation and consequent degradation of the asphalt.

Asphalt packets which comprise a non-tacky continuous coating as disclosed herein can comprise at least about 85% by weight of high-quality virgin asphalt and can be stored in appropriate containers at ambient temperature for at least 1 year and retain its free-flowing properties. The asphalt packets as disclosed herein can have a size and shape which, when heated to 300° F. from an ambient temperature in a rotating mixer with an acceptable gradation of proper ratio of high quality aggregate will produce a quality usable hot mix at about 280° F. to about 300° F. The asphalt packets as disclosed herein will melt when mixed with the correct ratio of aggregate in a rotating mixer at approximately the same rate as the aggregate heats up thus coating the aggregate uniformly to produce high quality hot mix.

Thus, an asphalt forming process is disclosed herein that comprises providing an appropriate aggregate gradation and providing a plurality of asphalt packets having non-tacky outer surfaces. Each of the asphalt packets can comprise asphalt that comprises an inner volume. The asphalt can be at least 85% by weight of high-quality virgin asphalt. The polymer film outer coating is non-tacky at ambient temperatures that permits stacking of a plurality of asphalt packets under weight without causing the packets to agglomerate. The asphalt packets can have a size and shape to create a surface-to-volume ratio that permits the polymer film outer coating and the asphalt to fully melt into a liquid asphalt composite when heated to between about 260° F. and about 340° F. before the asphalt begins to degrade.

When the polymer film outer coating and the asphalt are melted together, an asphalt composite is formed. The polymer from the film coating and the asphalt can comprise different amounts of the asphalt composite. For example, for an asphalt packet of generally rectangular shape of ⅛ inch×½ inch×¾ inch and a polymer film outer coating having a thickness of 4 mils, the asphalt comprises about 91% of the asphalt composite when melted and the polymer film coating comprises about 9% of the asphalt composite. In another embodiment, an asphalt packet of generally rectangular shape of ¼ inch×½ inch×¾ inch and a polymer film outer coating having a thickness of 4 mils can be provided where the asphalt comprises about 94% of the asphalt composite when melted and the polymer film coating comprises about 6% of the asphalt composite Each of the asphalt packets can also comprise a polymer film outer coating that encapsulates the volume of the asphalt. Other examples of asphalt composite composition are provided below in Table 6 showing different sized asphalt packets with polymer film outer coatings with different thickness.

TABLE 6

Percentage of Composition of Asphalt Composite Upon Melting of Asphalt Packet

| Asphalt Packet Shape | Volumetric Dimensions* in Inches (H × W × L) | Percentage of Composition of Asphalt Composite Upon Melting of Asphalt Packet | | |
|---|---|---|---|---|
| | | Polymer Coating Thickness (1 mils) | Polymer Coating Thickness (2 mils) | Polymer Coating Thickness (4 mils) |
| Rectangular Packet | ⅛ × ½ × ¾ | About 2.25% polymer About 97.75% asphalt | About 4.5% polymer About 95.5% asphalt | About 9% polymer About 91% asphalt |
| Rectangular Packet | ¼ × ½ × ¾ | About 1.5% polymer About 98.5% asphalt | About 3% polymer About 97% asphalt | About 6% polymer About 94% asphalt |

The process can also comprise providing a rotatable asphalt mixer and a heat source for heating contents placed in the rotatable asphalt mixer. The aggregate gradation and the plurality of asphalt packets can be inserted into the rotatable asphalt mixer and heated to temperatures of between about 260° F. and about 340° F. to permit the asphalt packets to fully melt and coat the aggregate uniformly as the aggregate reaches a maximum mix temperature, and prior to degradation of the asphalt composite due to prolonged exposure to excessive temperature. In some embodiments, the asphalt mix can comprise between about 5% to about 10% of asphalt packets by weight and between about 90% to about 95% aggregate. For example, in one embodiment, the asphalt packets comprise 6% and the aggregate comprises about 94% of the asphalt mix. In some embodiments, the aggregate gradation can be inserted into the rotational mixer first and heated before inserting the asphalt packets into the rotatable asphalt mixer and then heating both the aggregate and the plurality of asphalt packets. In some embodiments, both the aggregate gradation and the plurality of asphalt packets can be inserted into the rotatable mixer before beginning to heat the aggregate and the plurality of asphalt packets.

The present disclosure also provides processes of making asphalt packets. In some embodiments, the process of making asphalt packets can comprise providing liquid asphalt and providing liquefied polymer material that can be used to create a polymer film outer coating. The asphalt can comprise at least 85% of high-quality virgin asphalt. The polymer material can comprise one or more thermoplastic polymers that can be melted in a temperature range of between about 200° F. and about 340° F. In some embodiments, the one or more thermoplastic polymers that can be used as the outer coating layer can comprise at least one of ethylene-vinyl acetate (EVA), styrenic block copolymers (SBC), styrene-butadiene-styrene (SBS) block copolymers and styrene-ethylene-butylene-styrene (SEBS) polymers, such as those sold under the tradename of KRATON™. Further, some combination of polymeric blends of these polymers listed above can used.

Figure 8:
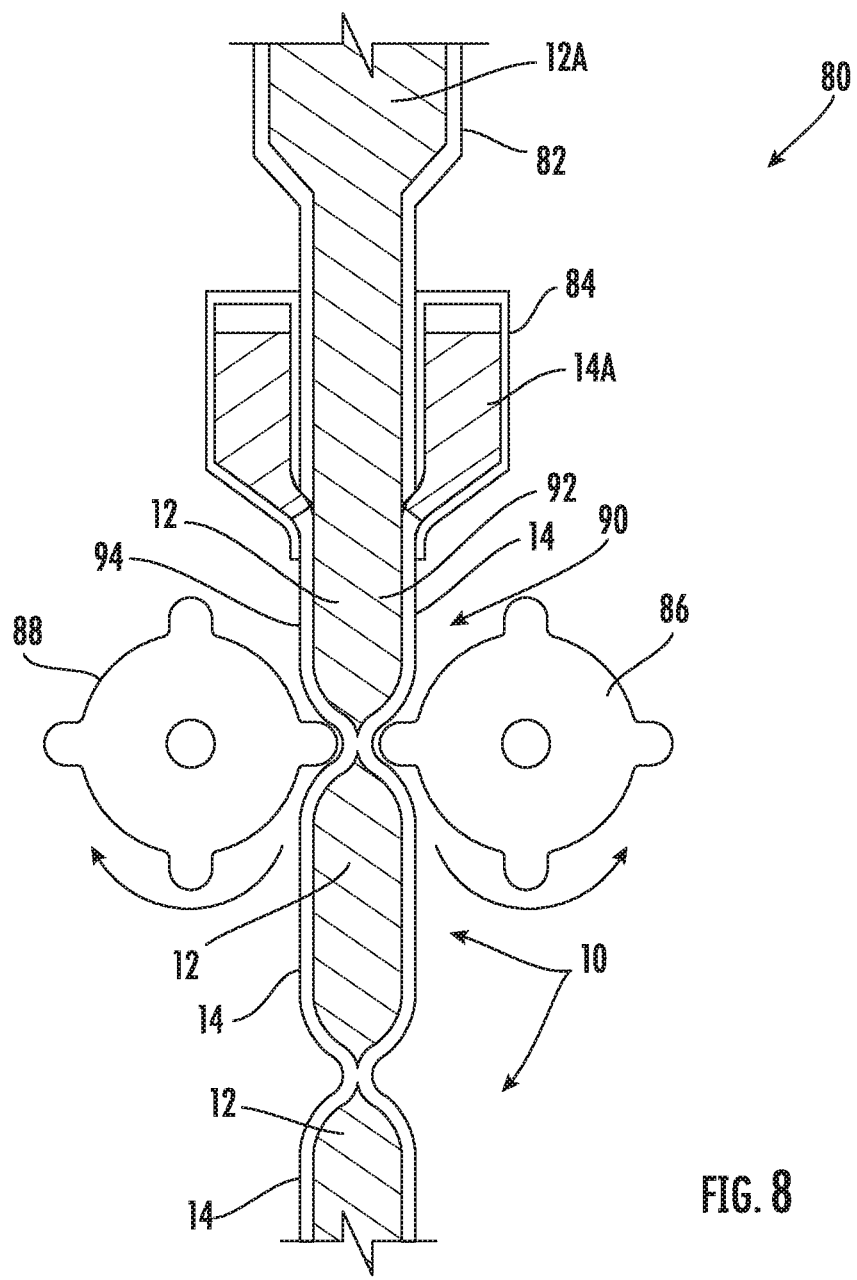
FIG. 8 illustrates a schematic cross-sectional view of an embodiment of a process for forming asphalt packet according to the present subject matter.

As shown in FIG. 8, a cross-section of an extruder 80 that can coextrude asphalt 12A and the polymer 14A into an extrudate 90 with the asphalt 12A forming a core 92 of the extrudate 90 and the polymer material forming an outer perimeter 94 of the extrudate 90 such that the polymer forms an outer surface of the extrudate 90. The extruder 80 can have a first extruder 82 that houses and maintains the liquified asphalt 12A and extrudes the asphalt 12 to form the core 92 while a second extruder 84 that houses and maintains the liquified polymer 14A can extrude a polymer film outer coating 14 around the core 92 of asphalt 12 such that the polymer film outer coating 14 forms the outer perimeter 94 of the coextrusion surrounding the core 92. The extrudate 90 can then be cooled and cut into asphalt packets 10 having a surface area to volume ratio of 10 or greater. In some embodiments as shown in FIG. 8, for example, the extruder 80 can include driven and synchronized sealing rollers 86, 88 that pinch or push the polymer film outer coating 14 together to form the extrudate 90 into asphalt packets 10 by forming ends of the packets 10. These sealing rollers 86, 88 can cut the asphalt packets 10 along the ends to form separate individualized packets 10 and cooled prior to packaging. Alternatively, in some embodiments, the sealing rollers 86, 88 can perforate the ends so that the asphalt packets 10 can be easily separate as needed by the user of the asphalt packets 10.

Figure 9C:
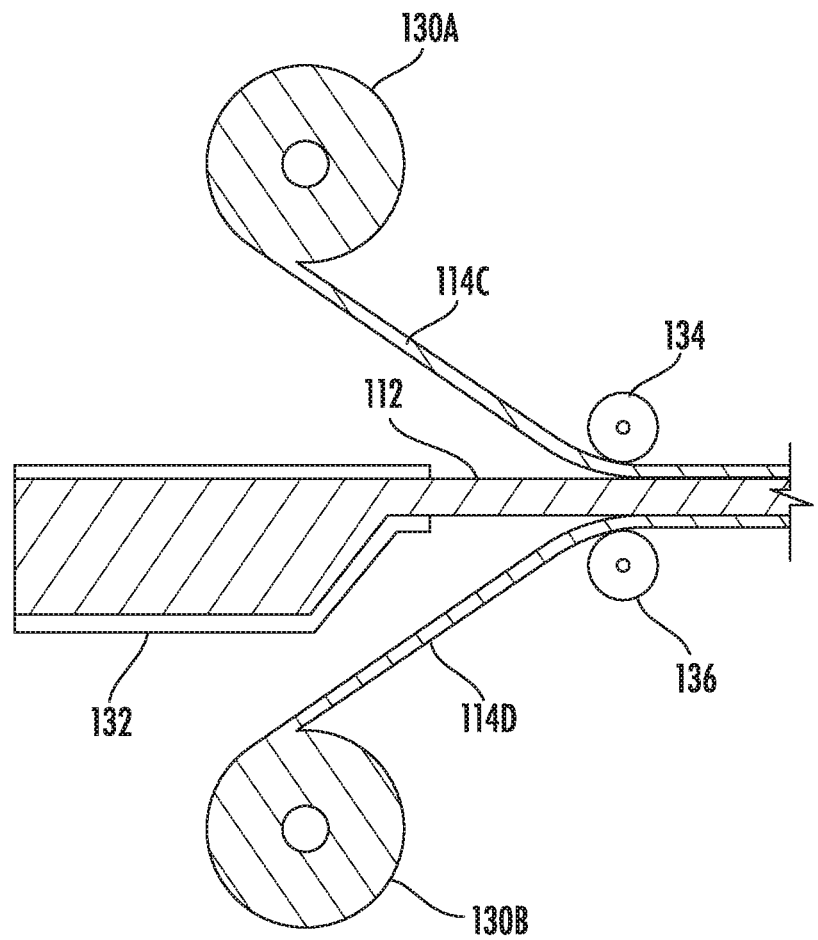
FIG. 9C illustrates a schematic cross-sectional view of a further embodiment of a process for forming asphalt packet according to the present subject matter.

In other embodiments of a process of making asphalt as shown in FIGS. 9A-9C, sheets of polymer or rolls of polymer sheeting can be used. In such embodiments, the process of making asphalt packets 110 can comprise providing a top sheet 114A, 114C of polymer and a bottom sheet 114B, 114D of polymer.

Referring to FIGS. 9A and 9B, another coextrusion process is provided. A coextruder 100 can be provided that can extrude a middle sheet of liquified asphalt 112 and extrude a sheet 114A of thermoplastic polymer on top of the sheet of liquified asphalt 112 and extrude a sheet 114B of thermoplastic polymer beneath the middle sheet of liquified asphalt 112. In particular, the extruder 100 can comprise a top polymer extruder 102 that can house polymer that can be extruded therefrom to form the top sheet 114A and a bottom extruder 104 that can house polymer that can be extruded therefrom to form the bottom sheet 114B. The extruder 100 can comprise a middle extruder 106 that extrudes the liquefied asphalt 112 between the top and bottom polymer sheets 114A, 114B. The middle sheet of asphalt 112 can have a thickness of about ⅛ of an inch and about ¼ of an inch while the top and bottom polymer sheets 114A, 114B can have a thickness of between about 0.001 inches and about 0.01 inches (between about 1 mil and about 10 mils). The top and bottom polymer sheets 114A, 114B and asphalt 112 together can be sealed into asphalt packets 110 comprising an asphalt inner volume and a polymer film coating outer surface such that the asphalt packets 110 have a surface area to volume ratio of 10 or greater. For example, the extruder 100 can include driven and synchronized sealing rollers 108, 109 that press the top and bottom polymer sheets 114A, 114B at specific locations to form side seals 122 and end seals 118 around the individual asphalt packets 110. The rotating sealing rollers 108, 109 press and seal the layers of middle sheet of asphalt 112 and top and bottom polymer sheets 114A, 114B into the asphalt packets 110 while the layers are still hot. As the layers and the asphalt packets 110 formed by the layers cool down, the layers of sheets can be cut along the end and side seal joints to form separate and individual packets 110.

FIG. 9C shows a slight alternative embodiment, instead of extruding the top and bottom sheets, a roll 130A of polymer sheeting to form the top sheet 114C of polymer and a roll 130B of polymer sheeting to form the bottom sheet 114D of polymer and can be provided. The polymer sheeting for the top and bottom polymer sheets 114C, 114D can be pulled from the rolls 130A, 130B as the asphalt is insert via extrusion onto the bottom polymer sheet 114D between the top and bottom polymer sheets 114C, 114D. For example, an extruder 132 can extrude the liquefied asphalt 112 onto the bottom sheet 114D between the top and bottom polymer sheets 114C, 114D. The middle sheet of asphalt 112 can have a thickness of about ⅛ of an inch and about ¼ of an inch while the top and bottom polymer sheets 114C, 114D can have a thickness of between about 0.001 inches and about 0.01 inches (between about 1 mil and about 10 mils). Guide rollers 134, 136 can be provided to ensure that the top and bottom polymer sheets 114C, 114D abut the extruded sheet of asphalt 112. Asphalt packets can be formed in a similar manner as the process shown in FIGS. 9A and 9B. For example, driven and synchronized sealing rollers can be provided that press the top and bottom polymer sheets 114C, 114D at specific locations to form side seals and end seals around the individual asphalt packets. The driven and synchronized sealing rollers can be heated to heat up the top and bottom polymer sheets 114C, 114D to seal them together. Once cooled, the asphalt packets can be cut into separate individualized asphalt packets that can be stored in a container and can be free-flowing from the container even after storage for extended periods of time.

To cut and seal the asphalt packets, in other embodiments, the top and bottom polymer sheets and asphalt together can be stamped into asphalt packets comprising an asphalt inner volume and a polymer film coating outer surface having a surface area to volume ratio of 10 or greater. For example, the top and bottom polymer sheets and asphalt together can be stamped using one or more dyes that can form the shape of the asphalt packets and seal the polymers from the top and bottom sheets together.

The solidified asphalt can be heated to liquefy the asphalt and providing the liquefied asphalt to an extruder to extrude the liquefied asphalt. In some embodiments, the solidified asphalt can be heated before being fed to the extruder. In some embodiments, the solidified asphalt can be heated in the extruder during the extrusion process.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is by way of example only, and is not intended to limit the present subject matter.

What is claimed is:

1. A process of making asphalt packets comprising:
providing liquid asphalt;
providing liquefied polymer;
coextruding the asphalt and the polymer into an extrudate with the asphalt forming a core of the extrudate and the polymer forming an outer perimeter of the extrudate such that the polymer forms an outer surface of the extrudate;
cutting the extrudate into asphalt packets having a surface area to volume ratio of 10 or greater.

2. The process of making asphalt packets according to claim 1, wherein the surface-to-volume ratio of each of the asphalt packets is between about 15 and about 20.

3. The process of making asphalt packets according to claim 1, wherein the surface-to-volume ratio of each of the asphalt packets is greater than about 20.

4. The process of making asphalt packets according to claim 1, wherein the polymer that forms the outer surface of the extrudate comprises at least one of ethylene-vinyl acetate (EVA), styrenic block copolymers (SBC), styrene-butadiene-styrene (SBS) block copolymers, styrene-ethylene-butylene-styrene (SEBS) polymers, or combinations thereof.

5. A process of making asphalt packets comprising:
providing a bottom sheet of polymer and a top sheet of polymer;
extruding liquefied asphalt between the top and bottom polymer sheets;
cutting and sealing the top and bottom polymer sheets and asphalt together into asphalt packets comprising an asphalt inner volume and a polymer film coating outer surface having a surface area to volume ratio of 10 or greater.

6. The process according to claim 5, wherein the step of providing a bottom sheet of polymer and a top sheet of polymer comprises providing rolls of polymer sheeting from which the bottom sheet of polymer and the top sheet of polymer can be cut.

7. The process according to claim 5, wherein the process further comprises heating solidified asphalt to liquefy the solidified asphalt and providing the liquefied asphalt to an extruder to extrude the liquefied asphalt.

8. The process according to claim 5, wherein the step of cutting and sealing the top and bottom polymer sheets and asphalt comprising stamping the top and bottom polymer sheets and asphalt together into asphalt packets comprising an asphalt inner volume and a polymer film coating outer surface having a surface area to volume ratio of 10 or greater.

9. The process according to claim 5, wherein the asphalt packets have a width of about 0.5 inches, a thickness of about 0.2 inches, and a length of about 0.75 inches.

10. The process according to claim 5, wherein the asphalt packets have a width of about 0.5 inches, a thickness of about 0.15 inches and a length of about 0.75 inches.

11. The process according to claim 5, wherein the asphalt packets have a width of between about 0.3 and about 0.5 inches, a thickness of between about 0.1 and about 0.2 inches, and a length of between about 0.50 to about 1.5 inches.

\* \* \* \* \*